United States Patent
Teipel et al.

(10) Patent No.: US 6,616,847 B1
(45) Date of Patent: Sep. 9, 2003

(54) METHOD FOR PRODUCING CRYSTALS FROM SOLUTIONS

(75) Inventors: Ulrich Teipel, Pfinztal (DE); Ulrich Förter-Barth, Karlsruhe (DE)

(73) Assignee: Frounhofer-Gesellschaft zur Förderung der angewandten Forschung e.V., München (DE)

(*) Notice: Subject to any disclaimer, the term of this patent is extended or adjusted under 35 U.S.C. 154(b) by 0 days.

(21) Appl. No.: 09/857,647

(22) PCT Filed: Dec. 22, 1999

(86) PCT No.: PCT/EP99/10270

§ 371 (c)(1),
(2), (4) Date: Jun. 7, 2001

(87) PCT Pub. No.: WO00/38812

PCT Pub. Date: Jul. 6, 2000

(30) Foreign Application Priority Data

Dec. 23, 1998 (DE) .......................... 198 59 876

(51) Int. Cl.$^7$ ............................. B01D 61/00
(52) U.S. Cl. .............. 210/651; 210/650; 210/652; 210/653; 210/654; 210/636
(58) Field of Search ............... 210/651, 652, 210/650, 654, 653; 426/478; 127/55; 117/11, 70

(56) References Cited

U.S. PATENT DOCUMENTS

| | | | |
|---|---|---|---|
| 4,207,183 A | | 6/1980 | Herrigel |
| 4,784,766 A | | 11/1988 | Moritoki |
| 4,822,907 A | * | 4/1989 | Sugiyama et al. |
| 4,994,332 A | * | 2/1991 | Coin et al. |
| 5,747,089 A | * | 5/1998 | Ljusberg et al. |
| 6,087,148 A | * | 7/2000 | Rancke-Madsen et al. |
| 6,451,357 B1 | * | 9/2002 | Farrow |

FOREIGN PATENT DOCUMENTS

| | | |
|---|---|---|
| DE | 23 48 807 | 4/1975 |
| DE | 41 10 050 | 1/1992 |
| EP | 0 288 122 | 10/1988 |
| EP | 0 547 512 | 6/1993 |
| EP | 05 97 851 | 5/1997 |
| FR | 2 672 816 | 8/1992 |
| JP | 60 19 3503 | 10/1985 |
| JP | 63 00 7802 | 1/1988 |
| WO | WO 94 11 309 | 5/1994 |

OTHER PUBLICATIONS

Brockhaus—Naturwissenschaften und Technik, vol. 3, 1983, pp. 243 to 244, "Membranverfahren".

Römpp Chemie Lexikon, 9$^{th}$. Edition 1992, p. 4798, "Ultrafiltation".

* cited by examiner

Primary Examiner—Ana Fortuna
(74) Attorney, Agent, or Firm—Paul Vincent

(57) ABSTRACT

The invention relates to a method for producing crystals from thermally sensitive solids. According to this method, the solid is dissolved in at least one solvent and the solution is concentrated by drawing off the solvent to beyond the saturation concentration of the solid, so that crystallized solids are formed. The solvent is caused to permeate a substantially semi-permeable membrane, preferably by being subjected to excess pressure. The inventive method can be carried out substantially isothermally in order to prevent the thermally sensitive crystals from being damaged.

23 Claims, No Drawings

METHOD FOR PRODUCING CRYSTALS FROM SOLUTIONS

The invention concerns a method for producing crystals from thermally sensitive solids by dissolving the solid in at least one solvent and concentrating the solution through drawing off the solvent to beyond the saturation concentration of the solid thereby forming the crystallized solid.

Crystallization is a known temperature dependent extraction or separating method with which one component of a homogeneous system consisting of at least two components, e.g. a solution, a molten mass or a gas mixture, is separated thereby forming a solid phase. During crystallization of one or more solids from a solution with molecularly dispersed distribution of the solids in a solvent, the solution is oversaturated through cooling (cooling crystallization), evaporation of the solvent (evaporation crystallization) or a combination of both these variants. Through reduction of this oversaturation, one obtains a crystallized solid which is mechanically separated from the remaining solution. This oversaturation can be supported through underpressure (vacuum crystallization), salting out, precipitation, optionally by adding seeds or through supply of mechanical energy (agitation). In particular, crystallization from solutions is used in a plurality of ways for cleaning or separating material mixtures, for concentrating solutions, for the production of particles with high purity or certain particle shapes or for modification of the crystalline phase to eliminate e.g. crystal imperfections.

The known crystallization methods, e.g. cooling and evaporation crystallization, have the disadvantage that energy consumption is high, since heat must be supplied to the solution and/or heat must be drawn off which causes considerable costs, particularly when using a solvent having a high heat capacity c, such as e.g. water ($c \approx 4.2$ J/gK). With thermally sensitive substances, there is the danger of damaging the crystals or solid structure itself. Even small amounts of damage can cause crystal imperfections, inclusions of disintegrated substances or the like. With thermally sensitive propellants, explosives, and explosive substances, the security risk increases with increasing temperature and increasing crystal mass.

The object of the invention is to propose a method for the production of crystals from thermally sensitive solids which largely requires no energy and also reliably prevents thermal damage to the crystals or solids.

In accordance with the invention, this object is achieved in a method of the above-mentioned type in that the solvent is permeated through a substantially semi-permeable membrane.

The invention is completely different than conventional crystallization methods, since the excessive saturation concentration required for crystallization is achieved through permeation of the solvent through a substantially semi-permeable membrane. The semi-permeable membrane is permeable to the solvent and optionally to impurities contained in the solvent but not to the solid to be crystallized. Permeation of the solvent through the membrane concentrates the remaining solution thereby exceeding the saturation concentration of the dissolved solid to produce the desired crystallization. When the solution is oversaturated, crystallization can be additionally supported through known methods, e.g. injecting the solution with its own or with foreign seeds.

Different membrane separating methods are known such as e.g. osmosis, reverse osmosis, nano-, ultra- and micro-filtration, dialysis or electro-dialysis, wherein the driving forces of selective permeation through a membrane are based e.g. on differences in concentration, pressure or electric potential. However, the known membrane methods are exclusively used for cleaning or recycling solvents, for concentrating dissolved or dispersed substances or for separating different, e.g. high-or low-molecular dispersed components. They are used for sea water, drinking water and waste water treatment, for desalination, for separating azeotropic mixtures, for sterile filtration or for different cleaning methods in the food or textile industry and in the field of medical technology, but not for obtaining crystalline solids.

DE 23 48 807 A1 describes a method for precipitating tartar from wine or sparkling wine, wherein the wine is separated through reverse osmosis into permeate and concentrate and crystalline tartar is precipitated in the concentrate. After filtration of the undesired tartar, permeate and concentrate are recombined into wine. This document exclusively concerns the purification of wine through precipitation of tartar, and therefore cannot give experts any indication as to the specific use of membrane methods for the production of crystals from thermally sensitive solids while thereby controlling the properties of the crystals obtained through variation of the method parameters.

While, in accordance with the invention, the permeation of the solvent through the membrane which is required for exceeding saturation concentration of the solution or for crystallization, can be effected in a simple fashion through the hydrostatic pressure of the crystallization solution located e.g. above the membrane, a preferred embodiment provides that a pressure drop is established between the solution and the permeate which is produced through underpressure on the permeate side or by applying an overpressure to the solution which may be, depending on the substance system and the respective membrane, between 1 and 100 bar. This permits control of the permeation and thereby of the speed of crystal formation and of the properties of the produced crystals, since crystal formation is accelerated with increasing overpressure and associated increased permeation of the solvent through the membrane. If e.g. large and regular crystals are desired, only a slight overpressure is applied to the solution to guarantee slow crystal growth. If, however, as fine a crystalline product as possible with high purity is desired, the pressure is increased to accelerate crystallization. In the latter case, the solution can also be agitated, e.g. stirred.

Depending on the type of substance solvent/solid system, the method in accordance with the invention can be effected using known membrane methods, wherein the driving force for permeation of the solvent through the membrane is a pressure difference between permeate and solution, such as micro-, ultra-, nano- or hyper-filtration (reverse osmosis). The above membrane methods depend in particular on the molecular diameter of the dissolved solid which is between 20 nm and 20 $\mu$m with micro-filtration, between 2 nm and 20 nm with ultra-filtration, between 1nm and 5nm with nano-filtration, and less than 3nm with hyper-filtration. The membranes used are distinguished substantially through their porosity, wherein the porosity is usually selected to be high for solids having molecules of larger diameter to achieve as high a permeation of the solvent as possible with as small a pressure difference as possible between the solution and the permeate. With hyper-filtration, the molecular diameter of the dissolved solid corresponds approximately to the molecular diameter of the solvent or only slightly exceeds same and homogeneous, dense membranes are used which permit permeation of the solvent only. With ultra-filtration, the molecular diameter of the solid is larger than the molecular diameter of the solvent and porous membranes are used which retain only higher-molecular dissolved and suspended or emulsified components. Microfiltration retains e.g. only suspended finely dispersed (not dissolved) components.

Suitable thermally sensitive solids are mainly propellants and/or explosives, pharmaceuticals and/or pharmaceutically effective agents, hormones and/or hormone derivatives and homeopathically effective agents or concentrations of plant substances which may be thermally damaged in the known crystallization methods, such as cooling or evaporation crystallization, or (for propellants and explosives) represent a great risk.

A preferred embodiment of the inventive method provides that the solution is held at a substantially constant temperature. Such isothermal processing carefully crystallizes the thermally sensitive substances, wherein the thermodynamic balance is maintained and the produced crystals have high purity with little or no internal stress and strain. A further advantage of substantially isothermal processing consists in that temperature-dependent changes in crystal modifications, which many thermally sensitive solids have, are prevented. As an example, ammonium nitrate (AN)-an explosive widely used in gas generators, repellant missiles or also airbags - exists in five different crystal modifications in dependence on the temperature, namely cubical in the temperature interval between 125° C. and its melting point of 169.5° C. (modification I), tetragonal in the temperature interval between 84° C. and 125° C. with a density of approximately $1.67 g/cm^3$ (modification II), orthorhombic in the temperature interval between 32° C. and 84° C. at a density of approximately $1.66 g/cm^3$ (modification III), also orthorhombic between −18° C. and 32° C. (modification IV), however with a density of approximately $1.73 g/cm^3$, and at temperatures below −18° C. orthorhombic pseudotetragonal (modification V). In particular, the density differences of the individual modifications produce stresses and strains leading to cracks in the crystal structure of this explosive and prevent or highly complicate its production in the form of pure, stress and strain-free crystals using conventional crystallization methods.

For the production of the crystallization solution, it is advisable to dissolve the solid in the solution in the region of its saturation concentration. The saturation degree of the solution can be varied in dependence on the respective substance system of solid(s) or solvent(s) to cause spontaneous or also delayed crystallization during subsequent permeation of the solvent through the membrane and thereby control crystal quality.

A preferred embodiment provides for the use of membranes with little blockage tendency. Towards this end, e.g. asymmetrical membranes can be used having an active layer, with the desired porosity disposed on a highly porous support structure. Arrangement of such an asymmetrical membrane with its active layer on the side facing the solution largely prevents blockage of the membrane by particles diffusing into the pores. Moreover, composite membranes can be used which have active layers with the desired porosity applied on one or both sides of a highly-porous support structure. Alternatively, or additionally, a further preferred embodiment provides that the membrane is moved, e.g. oscillated or acted upon with pressure pulses to prevent or release blocking, covering layers. This releases crystals adhering e.g. to the active membrane layer facing the solution and guarantees permanent permeation of the solvent through the membrane. The membrane is preferably acted upon with pressure pulses which are opposite to the permeation direction.

For carrying out the inventive method, membranes on the basis of natural polymers, such as cellulose acetates, cellulose acetate butyrates, cellulose acetate propionates or the like, membranes on the basis of synthetic polymers, polymers, such as polyamides, polysulfones, polyimides, polyamides hydrazides, polybenzimidazole, polyacryl acid, polyacryl nitrile or the like, membranes on the basis of metals or membranes on the basis of minerals, such as glass, ceramic or the like can be used.

For the inventive crystallization method, construction units (modules) known from membrane technology, e.g. tube, hollow fiber, capillary tube, plate modules or stirring cells can be used, which can be combined depending on the substance system, e.g. connected in parallel or in series and/or provided with membranes of different porosities. When using tube or capillary tube modules, the permeation of the solvent required for crystallization can be adjusted e.g. through the module length, wherein the module or several parallel modules can be disposed in loops.

The inventive method is explained in more detail below with reference to embodiments.

EXAMPLE 1

To produce fine-crystalline high purity particles of the explosive 3-nitro-1,2,4-triazole-5-on (NTO), a substantially saturated solution of NTO is disposed in isopropanol. The solution is introduced to a semi-permeable membrane having a retaining capacity for dissolved substances of a molecular diameter in the region of 1 nm (nanofiltration) with an overpressure of between 10 and 20 bar being applied to the solution. While the solvent (iso-propanol) permeates through the e.g. composite membrane, the solid (NTO) is retained by the membrane and its saturation concentration in the solution is exceeded which causes seed production with subsequent crystal growth. Crystallization is carried out in a tube module, wherein the crystal suspension is transferred to a downstream stir cell reactor for controlling crystal growth. This permits, in particular, continuous operation of the crystallization method.

EXAMPLE 2

For producing pure and stress-free particles of the explosive substance cyclotetramethylene-tetranitramine (octogene, HMX), a substantially saturated solution of HMX is introduced into a solvent mixture of dimethylformamide (DMF) and acetone. The solution is exposed to a semi-permeable membrane in accordance with example 1 and an overpressure is applied thereto. HMX is present, in dependence on the temperature, in four different crystal modifications of different densities (modification α having a density of $1.84 g/cm^3$, modification β having a density of $1.90 g/cm^3$ and modification δ having a density of $1.78 g/cm^3$ and modification δ having a density of $1.58 g/cm^3$). To obtain stress and strain-free crystals of modification α, the solvent mixture is permeated through the membrane at a substantially constant temperature, e.g. approximately 20° C., wherein the solid (α-HMX) is separated from the solution.

EXAMPLE 3

For producing pure and tension-free particles of the explosive substance 2,4,6,8,10,12-hexanitro-2,4,6,8,10,12-hexaazaisowurtzitane (HNIW,CL20), a substantially saturated solution of HNIW is used. HNIW is present, in dependence on the temperature, in four different crystal modifications having different densities (modification a having α density of $1.97 g/cm^3$, modification β having a density of 1.99 g/cm³, modification γ having a density of 1.93 g/cm³ and modification ε having a density of 2.03 g/cm³). To obtain stress-free crystals of modification a, crystallization is carried out in accordance with example 2.

What is claimed is:

1. A method for producing crystals from a thermally sensitive solid, the method comprising the steps of:
   a) dissolving the solid in at least one solvent;
   b) permeating, following step a), the solvent through at least one substantially semi-permeable membrane means;
   c) continuing step b) to concentrate the solution by drawing off the solvent to beyond a saturation concentration thereof to form a crystallized solid; and
   d) producing at least one of a propellant in crystal form, an explosive in crystal form, and a homeopathic effective substance in the form of crystals.

2. The method of claim 1, further comprising generating a pressure gradient between the solution and a permeate.

3. The method of claim 2, wherein an overpressure is applied to the solution.

4. The method of claim 2, wherein an overpressure of between 1 and 100 bar is applied to the solution.

5. The method of claim 1, further comprising maintaining the solution at a substantially constant temperature.

6. The method of claim 1, wherein step a) comprises dissolving the solid in the solution in a region of its saturation concentration.

7. The method of claim 6, wherein a saturation degree of the solution is varied in dependence on at least one of the solid and the solvent.

8. The method of claim 1, wherein said membrane means has little tendency for blockage.

9. The method of claim 8, wherein said membrane means is asymmetric.

10. The method of claim 8, wherein said membrane means is a composite membrane.

11. The method of claim 1, further comprising moving said membrane means to at least one of prevent and release blockage by covering layers.

12. The method of claim 11, wherein pressure pulses are applied to said membrane means.

13. The method of claim 12, wherein said pressure pulses pressurize said membrane means opposite to a direction of permeation.

14. The method of claim 11, wherein said membrane means is oscillated.

15. The method of claim 1, wherein said membrane means is based on at least one of a natural polymer, a cellulose acetate, a cellulose acetate butyrate, and a cellulose acetate propionate.

16. The method of claim 1, wherein said membrane means is based on at least one of a synthetic polymer, a polyamide, a polysulfone, a polyimide, a polyamide hydrazide, a polybenzimidazole, a polyacrylic acid, and a polyacrylic nitrile.

17. The method of claim 1, wherein said membrane means is based on a metal.

18. The method of claim 1, wherein said membrane means is based on at least one of a mineral, a glass, and a ceramic.

19. The method of claim 1, wherein said membrane means comprises a tube module.

20. The method of claim 1, wherein said membrane means comprises a capillary tube module.

21. The method of claim 1, wherein said membrane means comprises a hollow fiber module.

22. The method of claim 1, wherein said membrane comprises a plate module.

23. The method of claim 1, further comprising agitating the solution.

* * * * *

UNITED STATES PATENT AND TRADEMARK OFFICE
CERTIFICATE OF CORRECTION

PATENT NO. : 6,616,847 B1
DATED : September 09, 2003
INVENTOR(S) : Teipel, Ulrich et al.

It is certified that error appears in the above-identified patent and that said Letters Patent is hereby corrected as shown below:

<u>Title page,</u>
Item [73], Assignee, replace "Frounhofer" with -- Fraunhofer --.

Signed and Sealed this

Eleventh Day of November, 2003

JAMES E. ROGAN
*Director of the United States Patent and Trademark Office*